(12) United States Patent
Pike et al.

(10) Patent No.: US 7,688,721 B2
(45) Date of Patent: Mar. 30, 2010

(54) DISTRIBUTED COMMUNICATION TRAFFIC CONTROL SYSTEMS AND METHODS

(75) Inventors: Dion Pike, Stittsville (CA); Mark R. Megarity, Ottawa (CA); Joey M. W. Chow, Nepean (CA)

(73) Assignee: Alcatel Lucent, Paris (FR)

( * ) Notice: Subject to any disclaimer, the term of this patent is extended or adjusted under 35 U.S.C. 154(b) by 903 days.

(21) Appl. No.: 11/373,919

(22) Filed: Mar. 13, 2006

(65) Prior Publication Data

US 2007/0211627 A1 Sep. 13, 2007

(51) Int. Cl.
*H04L 12/26* (2006.01)
(52) U.S. Cl. ...................... 370/229; 709/238
(58) Field of Classification Search .............. 370/299, 370/230, 230.1, 235, 236; 379/111, 133; 709/234, 235, 238
See application file for complete search history.

(56) References Cited

U.S. PATENT DOCUMENTS

| | | | | |
|---|---|---|---|---|
| 3,979,730 A | * | 9/1976 | Bennett et al. | 710/31 |
| 5,892,962 A | * | 4/1999 | Cloutier | 712/16 |
| 5,914,936 A | * | 6/1999 | Hatono et al. | 370/230 |
| 6,671,257 B1 | * | 12/2003 | Soumiya et al. | 370/230.1 |
| 7,239,609 B2 | * | 7/2007 | Yokota et al. | 370/230 |
| 2007/0058541 A1 | * | 3/2007 | Pike et al. | 370/230 |
| 2007/0133419 A1 | * | 6/2007 | Segel | 370/236 |

* cited by examiner

*Primary Examiner*—Chi H Pham
*Assistant Examiner*—Fan Ng
(74) *Attorney, Agent, or Firm*—Eckert, Seamans, Cherin & Mellott, L.L.C.

(57) ABSTRACT

Distributed communication traffic control systems and methods are disclosed. An amount of communication traffic received from a traffic management device and stored in a communication traffic queue at a communication device is monitored. Based on the amount of communication traffic stored in the communication traffic queue, a determination is made, at the communication device, as to whether a traffic management action is to be performed. If a traffic management action is to be performed, the traffic management device is controlled to perform the determined traffic management action. The traffic management device may receive an indication of the determined traffic management action from a distributed traffic controller in the communication device, for example, and perform the traffic management action responsive to the indication.

6 Claims, 3 Drawing Sheets

DISTRIBUTED COMMUNICATION TRAFFIC CONTROL SYSTEMS AND METHODS

FIELD OF THE INVENTION

This invention relates generally to communications and, in particular, to communication traffic control.

BACKGROUND

Currently available traffic management schemes typically have a centralized egress queuing point from which traffic is scheduled. This architecture results in a several fundamental problems relating to cost, flexibility and performance.

In terms of cost, the scale of traffic management requirements must generally be determined ahead of time and sufficient memory and other resources must be provided in an initial deployment. A negative impact of this approach is the high "cost of entry" that can be associated with meeting demanding traffic management requirements.

Flexibility can also be lacking in conventional traffic management systems, in that traffic management systems tend to be designed to fit unique customer applications, to support a number of queuing entities, depth of memory, number of virtual output ports, etc.

As the number of unique customer applications grows, the ability to monitor and react quickly enough to traffic flow changes that are specific to a particular customer application while still ensuring Service Level Agreements (SLAs) or other service commitments can be immensely challenging. Traffic management systems that are on the market today might not adequately meet this performance challenge.

Especially for egress (customer facing traffic flow) in modern communication equipment such as routers and switches, the number of interfaces and/or the number of uniquely identifiable customer traffic flows can be much greater than the physical number of "entities" that existing traffic management systems can differentiate and react to. Although software-based backpressure mechanisms have been developed to address this problem, such mechanisms might not be fast enough to sustain reasonably high customer data rates. For example, the effectiveness of many software backpressure mechanisms degrades at DS3 rates and above.

Thus, there remains a need for improved communication traffic control techniques.

SUMMARY OF THE INVENTION

Embodiments of the invention address these issues by distributing control of a subset of one or more "backpressurable" entities. A "push" reaction mechanism may also be provided to alleviate dependence on a central processing engine that normally controls a central traffic management device. Either or both of these techniques may enable higher numbers of high-speed customer data flows per traffic management device. Overall traffic management performance will be improved, which allows higher quality SLAs to be supported in a communication system.

According to an aspect of the invention, an apparatus includes a queue monitor for monitoring an amount of communication traffic stored in a communication traffic queue. The communication traffic queue is configured to store communication traffic received from a traffic management device. The apparatus also includes a traffic controller, operatively coupled to the queue monitor, for determining based on the amount of communication traffic stored in the communication traffic queue a traffic management action to be performed, and for controlling the traffic management device to perform the determined traffic management action.

If the communication traffic queue is configured to receive communication traffic from the traffic management device over a communication equipment data path, then the traffic controller may be configured for controlling the traffic management device by providing an indication of the determined traffic management action to the traffic management device over the data path.

The data path may include a data path component that is operatively coupled to the communication traffic queue, to the traffic controller, and to the traffic management device. In this case, the traffic controller may be configured to provide the indication of the determined traffic management action to the traffic management device by providing the indication to the data path component. The indication causes the data path component to control the traffic management device to perform the determined traffic management action.

In some embodiments, the apparatus includes another data path component, operatively coupled to the communication traffic queue, for receiving communication traffic from the traffic management device through the data path. The data path component of the apparatus may include a processor implementing the queue monitor and the traffic controller. In one embodiment, this data path component is a Field Programmable Gate Array.

The apparatus may be implemented, for example, in communication equipment that also includes the traffic management device, which performs the determined traffic management action under control of the traffic controller. The apparatus and the traffic management device may be implemented in respective electronic circuit cards for instance.

Another aspect of the invention provides a method that includes storing communication traffic received from a traffic management device to a communication traffic queue at a communication device, monitoring at the communication device an amount of communication traffic stored in the communication traffic queue, determining at the communication device, based on the amount of communication traffic stored in the communication traffic queue, a traffic management action to be performed, and controlling the traffic management device to perform the determined traffic management action.

The operation of receiving may involve receiving communication traffic from the traffic management device through a communication equipment data path and a data path component operatively coupled to the traffic management device. In this case, the operation of controlling may involve providing an indication of the determined traffic management action to the data path component. The indication causes the data path component to control the traffic management device to perform the determined traffic management action.

Such a method may be embodied, for example, in instructions stored on a machine-readable medium.

Another aspect of the invention provides an apparatus that includes an interface for receiving from a distributed traffic controller in a communication device an indication of a traffic management action to be performed for communication traffic destined to the communication device, and a traffic management device, operatively coupled to the interface, for transferring communication traffic to the communication device, and for performing the traffic management action responsive to the indication.

The interface may be an interface to a communication equipment data path through which the traffic management device is configured to transfer communication traffic to the communication device. In this case, the interface may include a data path component for receiving the indication of the traffic management action from the communication device and for controlling the traffic management device to perform the determined traffic management action.

If traffic management actions performed by the traffic management device are controlled by registers, the data path component may be configured to control the traffic management device by writing control information to at least one of the registers.

The apparatus may also include a processor operatively coupled to the traffic management device through a communication equipment control path. The traffic management device may be controllable by the processor. In such an embodiment, the data path component may be configured to control the traffic management device by monitoring the control path and providing control information directly to the traffic management device through the control path when the control path is available.

The interface may be operable to receive from a plurality of distributed traffic controllers in respective communication devices of a plurality of communication devices indications of traffic management actions to be performed for communication traffic respectively destined to each communication device. The traffic management device may then be operable to transfer communication traffic to the plurality of communication devices, and to perform the traffic management actions for communication traffic destined to each communication device of the plurality of communication devices responsive to the indication received from the communication device.

Communication equipment in which the apparatus is implemented may also include one or more communication devices.

A method according to a further aspect of the invention includes transferring communication traffic from a traffic management device to a communication device, receiving from the communication device an indication of a traffic management action to be performed for communication traffic destined to the communication device, and performing the traffic management action at the traffic management device responsive to the indication.

In some embodiments, the operation of transferring involves transferring communication traffic from the traffic management device to a plurality of communication devices, the operation of receiving involves receiving from any of the plurality of communication devices a respective indication of a traffic management action to be performed for communication traffic destined to the communication device, and the operation of performing involves performing, responsive to each indication received from any of the plurality of communication devices, the traffic management action for communication traffic destined to the communication device of the plurality of communication devices from which each indication was received.

A machine-readable medium may store instructions which when executed perform the method.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
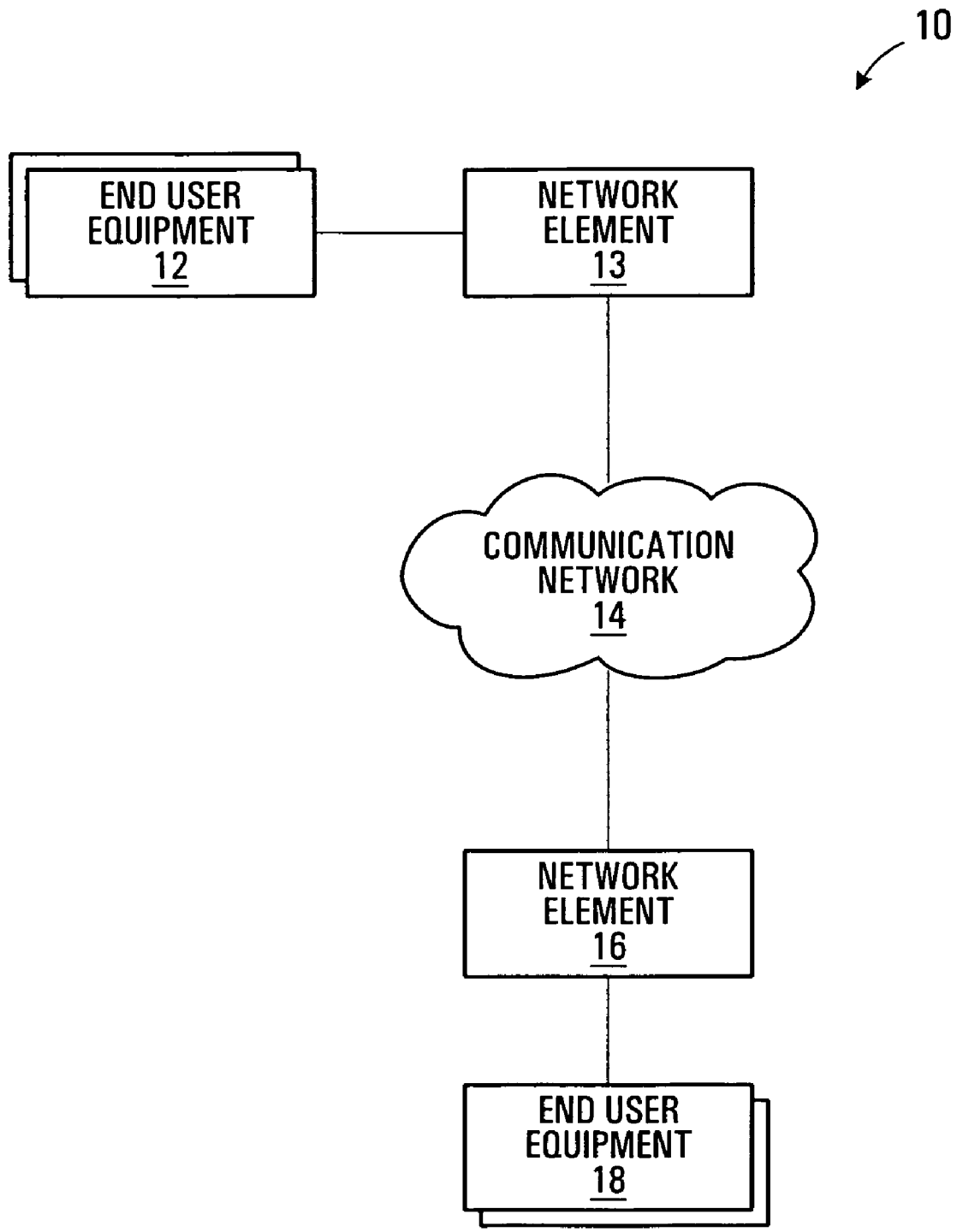
FIG. 1 is a block diagram of a communication system.

FIG. 1 is a block diagram of a communication system 10, in which some embodiments of the invention may be implemented. The communication system 10 includes end user communication equipment 12, 18, network elements 13, 16, and a communication network 14. Although many installations of end user equipment 12, 18 and network elements 13, 16 may be connected to the communication network 14, only two examples of each of these components have been labelled in FIG. 1 in order to avoid overly complicating the drawing. It should therefore be appreciated that the system of FIG. 1, as well as the contents of the other drawings, are intended solely for illustrative purposes, and that the present invention is in no way limited to the particular example embodiments explicitly shown in the drawings and described herein.

The end user equipment 12, 18 represents communication equipment that is configured to generate and transmit and/or to receive and terminate communication traffic. Although shown as being directly connected to the network elements 13, 16, it will be apparent that the end user equipment 12, 18 may communicate with the network elements 13, 16 through other components (not shown).

Switches and routers are illustrative of the types of communication equipment represented by the network elements 13, 16. The network elements 13, 16 provide access to the communication network 14 and thus have been shown separately in FIG. 1 for illustrative purposes.

The communication network 14, in addition to the border or edge network elements 13, 16, may also include intermediate network elements which route communication traffic through the communication network 14. It should be noted that, in some embodiments, the network 14 could, itself, consist of the network elements 13, 16. The network elements 13, 16 may thus be edge, core, or other types of communication equipment.

Many different types of end user, intermediate, and network communication equipment, as well as the operation thereof, will be apparent to those skilled in the art. In general, communication traffic originating with end user equipment 12, 18, and possibly other sources of communication traffic, for transfer to a remote destination through the communication network 14 is received by a network element 13, 16, translated between different protocols or formats if necessary, and routed through the communication network 14. In a particular example embodiment, the network elements 13, 16 exchange traffic with the end user communication equipment 12, 18 over Asynchronous Transfer Mode (ATM) or Synchronous Optical Network (SONET), using Packet over SONET (POS) mechanisms for instance, whereas the communication network 14 is an IP or MPLS network. However, it should be appreciated that embodiments of the invention are not limited to any particular types of communication equipment, transfer mechanisms, or protocols.

One common type of installation for communication network equipment such as the network elements 13, 16 includes an equipment rack carrying shelves that have multiple slots for receiving electronic circuit cards. The communication equipment may include hardware for supporting communications with the communication network 14 and for performing general processing of communication traffic. Electronic circuit cards such as line cards and I/O cards are then used in one or more of the slots to provide a medium- or protocol-specific interface. Using this kind of architecture, it tends to be easier to maintain spares for medium-specific modules in case of equipment failure, and substantially the same hardware core may be used in conjunction with various medium-specific modules.

In communication equipment such as the network elements 13, 16, it may be desirable to support enhanced traffic control mechanisms, such as to allow backpressuring of a higher number of communication interfaces, customer data flows, or other entities. According to aspects of the invention as disclosed herein, mechanisms to distribute traffic control for a subset of backpressurable entities and to permit a push mechanism for reaction to backpressure conditions are provided. These mechanisms may be used to offload at least some traffic control processing from a central processing engine, and thus reduce the reliance of traffic control on the central processing engine.

Figure 2:
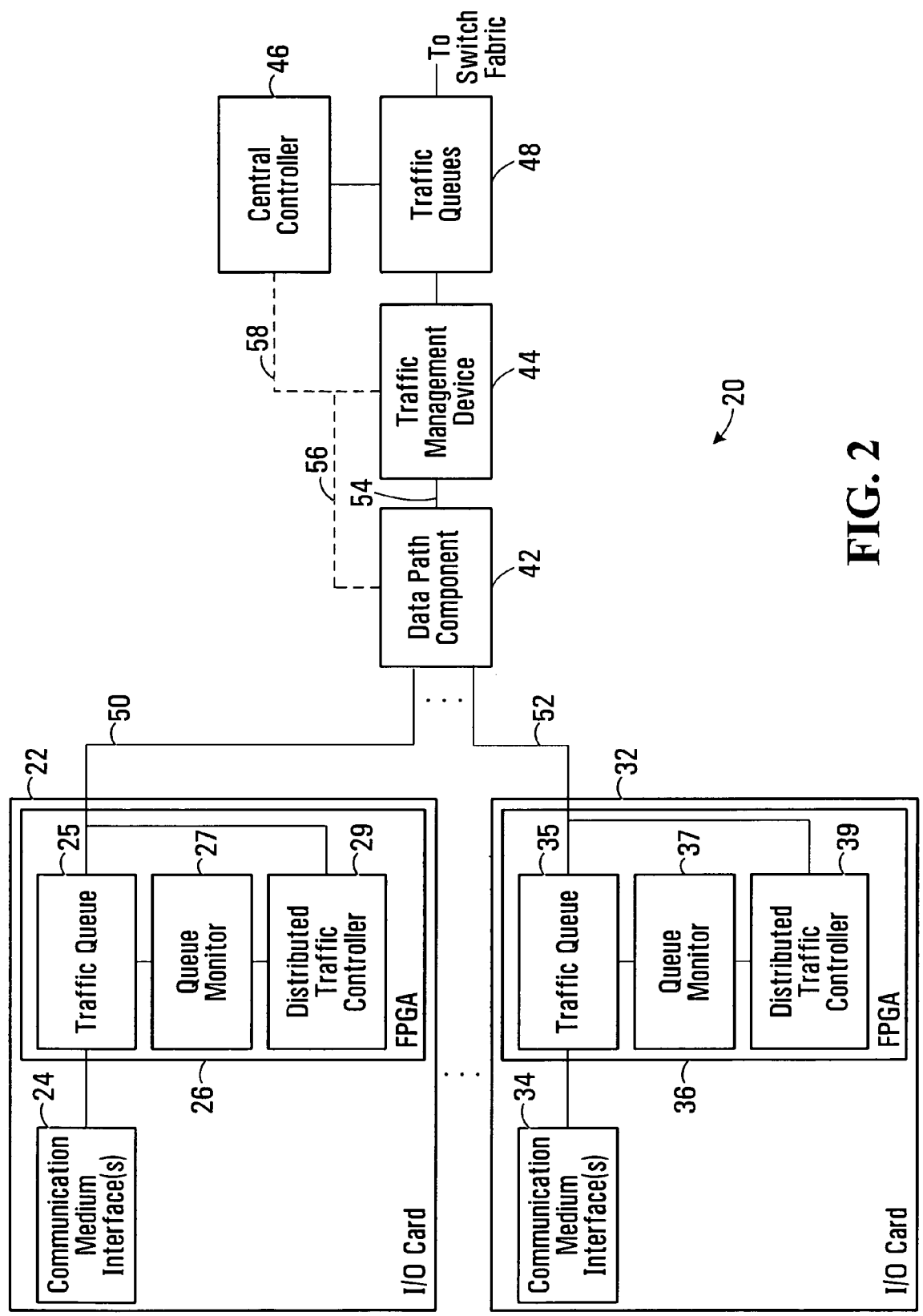
FIG. 2 is a block diagram of communication equipment.

FIG. 2 is a block diagram of communication equipment. The equipment 20 may be implemented in a network element such as the network elements 13, 16 of FIG. 1, for example.

The equipment 20 includes a plurality of communication devices, shown as I/O cards 22, 32, a data path component 42 operatively coupled to the traffic queues 25, 35 of the I/O cards 22, 32, a traffic management device 44 operatively coupled to the data path component 42, traffic queues 48 operatively coupled to the traffic management device 44, and a central controller 46 operatively coupled to the traffic management device 44 and to the data path component 42. Each of the I/O cards 22, 32 includes one or more communication medium interface(s) 24, 34, and a traffic queue 25, 35, a queue monitor 27, 37, and a distributed traffic controller 29, 39, which are implemented using Field Programmable Gate Arrays (FPGAs) 26, 36 in the example shown.

It should be appreciated that the particular structure shown in FIG. 2 is intended solely for the purposes of illustration, and not to limit the invention.

For example, communication equipment in which an embodiment of the invention is implemented may include more or fewer communication devices, of similar or different types, than the two I/O cards 22, 32 specifically shown.

Other components such as a switch fabric might also be provided to switch or otherwise process communication traffic that is received on or is to be transmitted through the communication medium interface(s) 24, 34. In addition, the FPGAs 26, 36 represent only one illustrative example of a type of component in which the techniques disclosed herein might be implemented.

The types of connections through which the components of FIG. 2 are operatively coupled may, to at least some extent, be implementation-dependent. Communication equipment components often use various types of physical connectors and wired connections such as midplane and backplane conductors, although the present invention is in no way limited to wired connections. In the case of cooperating software functions, for example, an operative coupling may be through variables or registers, and thus moreso a logical coupling than a direct physical coupling.

Referring first to the I/O cards 22, 32, the communication medium interface(s) 24, 34 provide one or more interfaces to respective communication media. These interfaces may include, for example, communication ports for connection to physical communication lines, or I/O modules for connection to components such as line cards that enable communication traffic to be exchanged with other communication devices or equipment. The interface(s) 24, 34 may thus be directly or indirectly coupled to communication media. In one embodiment, the communication medium interface(s) 24, 34 handle communication traffic of different media types.

Hardware, software, firmware, or combinations thereof may be used to implement the communication medium interface(s) 24, 34. Components that may be suitable for implementing the interface(s) 24, 34 include, among others, microprocessors, microcontrollers, programmable logic devices (PLDs), FPGAs, Application Specific Integrated Circuits (ASICs), and other types of "intelligent" integrated circuits.

As shown, the traffic queues 25, 35, the queue monitors 27, 37, and the distributed traffic controllers 29, 39 may be provided in FPGAs 26, 36. In one embodiment, the FPGA package used to implement the FPGAs 26, 36 includes one or more configurable high-speed serial transceivers for enabling communication traffic transfer between the traffic queues 25, 35 and the data path component 42, as well as a local processor. Those skilled in the art will appreciate that such a local processor may be an embedded microprocessor in some instantiations. In this case, the local processor is a hard core within the FPGA device. It is also possible to create a soft core for this purpose.

As the primary function of the FPGAs 26, 36 would in this case be to support data transfers on the data path segments 50, 52, the local FPGA processors might be under-utilized, or not utilized at all, during normal operations of the I/O cards 22, 32. Using those local processors, which are "free" in the sense that they are included in the FPGA package but not normally used, to implement the queue monitors 27, 37 and/or the distributed traffic controllers 29, 39 can substantially reduce the cost of providing enhanced traffic control in accordance with the techniques disclosed herein.

The data path component 42 may similarly be implemented using hardware, software, firmware, or some combination thereof. In some embodiments, the data path component 42 is implemented using the same FPGA package as the I/O card FPGAs 26, 36.

Many examples of traffic management devices such as the traffic management device 44, which may also be implemented using hardware, software, and/or firmware, will be apparent to those skilled in the art. Communication traffic that is received from a switch fabric, for example, is retrieved from the traffic queues 48 and transferred to the I/O cards 22, 32 by the traffic management device 44. Traffic management actions such as reducing or increasing a rate of traffic transfer or stopping traffic transfer entirely may be supported by the traffic management device 44.

The central controller 46, illustratively a microprocessor on a main line processing electronic circuit card on which the data path component 42, the traffic management device 44, and the traffic queues 48 are also provided, may control which of these actions are performed by the traffic management device 44 at any time. Through a control path 58, the central controller 46 might write control information to registers in the traffic management device 44, for example. In accordance with an aspect of the invention, the traffic management device 44 is also or instead controllable by the distributed traffic controllers 29, 39.

Communication traffic destined for the I/O cards 22, 32, or more specifically to ports or interfaces of those cards, is stored in the traffic queues 48. Solid state memory devices are often used for this purpose, although embodiments in which other types of storage media are used to implement the traffic queues 48 are also contemplated. The traffic queues 48 may include per-I/O card queues, per-port queues, per-flow queues, or possibly other types of queue.

In operation, the traffic queues 25, 35 receive communication traffic from the traffic management device 44. For simplicity, a data path over which this transfer is made has been shown as a single line 50, 52 between the data path component 42 and each of the traffic queues 25, 35. However, an actual implementation might involve a more indirect route, through multiple physical connections and/or multiple transceivers, for example.

The queue monitors 27, 37 monitor the amounts of communication traffic that are currently stored in their respective traffic queues 25, 35. It should be appreciated that although only one traffic queue 25, 35 per I/O card has been shown in FIG. 2, an I/O card or other type of communication device may include multiple traffic queues, any or all of which could be monitored by a queue monitor. Queue depth information is provided by each queue monitor 27, 37 to its distributed traffic controller 29, 39. This queue depth information might include absolute queue depths and/or relative queue depths. A relative queue depth could indicate the depth of a queue relative to one or more thresholds.

Transfer of queue depth information may be made according to a schedule, triggered when a queue depth reaches or crosses a threshold, or explicitly requested by a distributed traffic controller 29, 39. Any or all of these transfer schemes may be supported by the queue monitors 27, 37 and the distributed traffic controllers 29, 39.

Each distributed traffic controller 29, 39 makes a determination, based on the amount of communication traffic stored in its corresponding communication traffic queue 25, 35, as to whether a traffic management action should be performed by the traffic management device 44. Where the depth of the queue 25 is above a threshold, for example, the distributed traffic controller 29 might determine that the traffic management device 44 should reduce the current transfer rate of communication traffic destined for the queue 25. This may involve all traffic destined for the I/O card 22, or only certain communication traffic where the traffic queue 25 includes multiple queues. Multiple queues might be provided if the I/O card 22 is designed to output communication traffic to multiple ports or interfaces for instance.

If a distributed traffic controller 29, 39 determines that a traffic control action is to be performed, then that traffic controller controls the traffic management device 44 to perform the determined traffic management action. In the equipment 20, the distributed traffic controllers 29, 39 control the traffic management device 44 by providing an indication of the determined traffic management action, such as an instruction or command, to the traffic management device over the data path 50, 52. It is also contemplated that this distributed control might be enabled by a control path, which is not explicitly shown in FIG. 2 but would normally be provided in communication equipment, or a dedicated path such as a side band bus.

An indication of a determined traffic management action may specify the action to be performed, and possibly the communication traffic on which the action is to be performed. Particular communication traffic might be specified in terms of a destination, source, priority, class, port number, or I/O card identifier, for instance.

Transfer of a traffic management action indication from a distributed traffic controller 29, 39 to the traffic management device 44 in the equipment 20 is through the data path component 42. The same data path 50, 52 over which communication traffic is received is also used for traffic control. The data path component 42 is thus operable to both transfer communication traffic to, and receive control information from, the I/O cards 22, 32. In this case, control of the traffic management device 44 is indirect, in that an indication of a traffic management action is provided to the data path component 42 by a distributed traffic controller 29, 39 and causes the data path component to control the traffic management device 44 to actually perform the traffic management action.

The data path component 42 may therefore be considered one illustrative example of an interface for receiving from a distributed traffic controller an indication of a traffic management action to be performed by the traffic management device 44. Respective indications may be received from distributed traffic controllers in one or more communication devices, the I/O cards 22, 32 in the equipment 20, depending on the number of communication devices installed in communication equipment and the types of those communication devices. For example, electronic cards may be installed in or removed from card slots in a communication equipment shelf, and accordingly the number of installed communication devices may change. It is also possible that not every installed device will implement a distributed traffic controller 29, 39. Therefore, the data path component 42 or another interface operatively coupled to the traffic management device 44 may receive control information from distributed controllers in any or all communication devices installed in a piece of communication equipment.

As noted above, the data path component 42 is one possible implementation of an interface to the traffic management device 44. More generally, this interface may be any mechanism or component through which control information may be provided to the traffic management device 44. In the equipment 20, the traffic management device 44 may also or instead receive control information through an interface to a control path 58. These and/or other types of interfaces may be provided without departing from the present invention.

Control information transfer from the data path component 42 to the traffic management device 44 may be made, through the same data path 54 over which the traffic management device transfers communication traffic to communication devices, in the form of a control message or signal for instance. Transferring control information in a data path, in general, is faster than transferring the information in a control path, since a data path is usually a faster interface than a control path. Thus, using a data path transfer scheme may support faster responses to changes in traffic conditions.

Another possible control mechanism involves "pushing" control information from the data path component 42 to the traffic management device 44. Where traffic management actions performed by the traffic management device 44 are controlled by values stored in registers, for example, the data path component 42 could control the traffic management device 44 by writing control information to one or more of those registers through a connection 56 to the control path 58. In this case, the data path component 42 could monitor the control path 58 for activity from the central controller 46, and transfer control information directly to the traffic management device 44 through the control path when the control path is available. The traffic management device 44 is then controllable in substantially the same manner by the central controller 46 or the data path component 42.

The data path component 42 might instead transfer traffic management action indications or other control information to the central controller 46, which would then control the traffic management device 44 to perform traffic management actions. Control mechanisms in which the traffic management device 44 is directly controlled by the data path component 42 or by the distributed traffic controller 29, 39 may be preferred where it is desired to reduce the reliance on the central controller 46.

Figure 3:
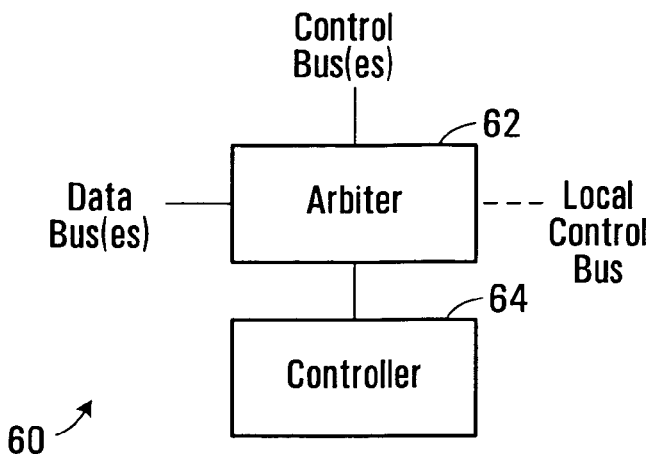
FIG. 3 is a block diagram of an example control element.

From the foregoing, it will be apparent a control element, such as the distributed traffic controllers 29, 39 and the data path component 42, may be configured to transfer control information to a controlled element through a data path or a control path. FIG. 3 is a block diagram of an example control element.

The control element 60 includes an arbiter 62 that is operatively coupled to a data path in the form of one or more data buses, to a control path in the form of one or more control buses, and to a local control bus. A controller 64, illustratively a distributed traffic controller or a controller in a data path component such as 42 (FIG. 2), is operatively coupled to the arbiter 62. Although the controller 64 may also be operatively coupled to other components such as a queue monitor, these other components have not been explicitly shown in FIG. 3.

In a communication device, the arbiter 62 might be coupled to a physical serial bus implementing the data path 50, 52 (FIG. 2), and to an equipment control path that is normally provided to each card slot connector or other communication device interface. An additional side band bus for transfer of control information from distributed traffic controllers to a traffic management device is another example of a control bus. A local control bus would be more applicable to a control element such as the data path component 42 (FIG. 2) that is provided on the same card or board as a traffic management device. In this case, as described above, the controller 64 could provide control information to the traffic management device through a data bus implementing the data path 54 (FIG. 2) or a control bus implementing the control path 56.

The arbiter 62 enables the controller 64 to receive and/or send control information on any of various buses, and represents one example of a physical component in which the control information transfer options noted above could be implemented. Other possible implementations may be or become apparent to those skilled in the art.

With reference again to FIG. 2, the traffic management device 44 performs at least some of its traffic management actions under the control of the distributed traffic controllers 29, 39. The central controller 46 may still be involved in controlling the operation of the traffic management device 44, depending on the control mechanism used and/or the types of installed communication devices. Traffic control for any communication devices in which a distributed traffic controller is not provided, for example, may be handled by the central controller 46 in accordance with conventional techniques. Implementation of embodiments of the invention in communication equipment thus does not necessarily preclude the use of other traffic control techniques in the same equipment.

A level or "granularity" of differentiation between communication traffic for the purposes of performing a traffic management action is dependent to some extent on the implementation of the traffic management device 44. The primary limiting factor in respect of selective traffic control tends to be the actual control function rather than traffic differentiation. Even though thousands of traffic queues 48 can potentially be provided in existing communication equipment, this extent of selective traffic management can be extremely difficult to provide, especially for higher data rates. In the equipment 20, however, distribution of the control function among distributed traffic controllers 29, 39 offloads the tasks of queue monitoring and making decisions in respect of traffic management actions from the central controller 46.

In many traffic control systems, a single central controller must gather queue statistics from all installed communication devices, process those statistics to determine appropriate traffic management actions to be performed for each communication device, and then control a traffic management device to perform those actions. All of these tasks are in addition to other tasks that a processor in which such a central controller is typically implemented must also handle. With the distributed traffic controllers 29, 39, the traffic management device 44 can often respond more quickly to high or low fill levels of the traffic queues 25, 35, and also perform traffic management actions for a higher number of backpressurable entities.

Generally, software backpressuring tends to be slower than hardware backpressuring. In some embodiments, the present invention implements a form of firmware backpressuring, which can provide the advantage of a high number of backpressurable entities, as in software backpressuring, without the same speed constraints as normal software backpressuring. The central controller 46 or another component of a main line processing card, for example, might configure queue thresholds and decision algorithms in a processor of an FPGA 26, 36 when an I/O card 22, 32 is first installed. The FPGA processor is then effectively a configured firmware element that monitors queues and makes traffic management action decisions.

Figure 4:
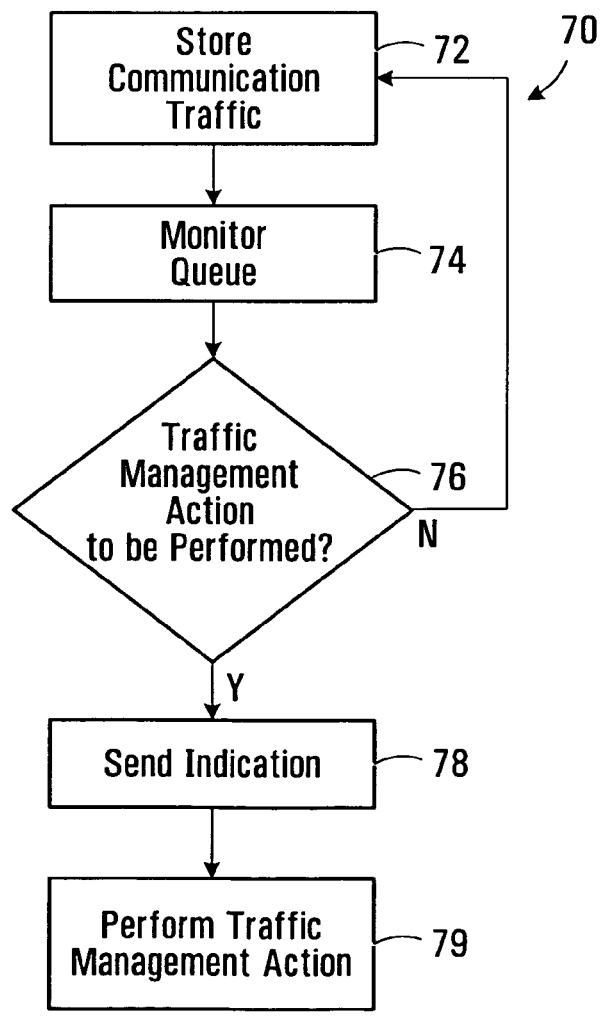
FIG. 4 is a flow diagram of a communication traffic control method.

FIG. 4 is a flow diagram of a communication traffic control method. In the method 70, communication traffic that is received from a traffic management device is stored at 72 to a communication traffic queue in a communication device. At 74, an amount of communication traffic stored in the communication traffic queue is monitored, and a determination is made at 76, based on the amount of communication traffic stored in the communication traffic queue, as to whether a traffic management action is to be performed.

Where traffic queue levels are within acceptable limits, then no traffic management action may be necessary, and the traffic storing and queue monitoring operations at 72, 74 may continue. As described in detail above, if a distributed controller at a communication device determines at 76 that a traffic management action is to be performed, then the traffic management device is controlled to perform that traffic management action. This may involve sending an indication of the traffic management action to the traffic management action at 78, either directly or through a data path component, for example. The traffic management action is then performed by the traffic management device at 79.

The method 70 is illustrative of one embodiment of the invention. Other embodiments may involve further or fewer operations, performed in a similar or different order than explicitly shown. Further variations of the method 70, including various ways of performing traffic control operations, may be or become apparent to those skilled in the art.

The techniques disclosed herein may be used to increase the number of uniquely identifiable customer traffic flows beyond the limited number of backpressurable entities that can be supported in currently existing traffic management systems. These techniques may be implemented in a manner so that they are not limited by the relatively slow reaction time of pure software mechanisms, which are non-deterministic in a real time operating system environment.

Thresholds of distributed traffic queues are monitored and organized by distributed controllers, which in one embodiment are implemented using processors that are already provided in data path FPGAs. Traffic management action information for these traffic queues, which controls a traffic management device to perform a traffic management action, may be embedded into a high-speed data path going back to a main processing card or other component in which the traffic management device is implemented. In some embodiments, a data path FPGA on the main processing card accumulates control information it receives from each of one or more distributed controllers and pushes updates to the traffic management device. The data path FPGA may push these updates to the traffic management device by monitoring a control path to "steal" cycles from a central controller. A processor within the data path FPGA can be used for this purpose. The push function might also be accomplished as part of a Direct Memory Access (DMA) operation. This push capability can ensure that a fixed time guarantee is in place for reacting to changes in customer data flow and that SLAs are met across a multitude of unique customer data flows, without being at the mercy of a central controller or main processor that may have many other high priority tasks to perform.

Thus, embodiments of the invention may solve an important problem for the design of state of the art traffic management systems, which enable scalable, low cost routers and other communication equipment to guarantee high-quality SLAs on many traffic flows.

What has been described is merely illustrative of the application of principles of embodiments of the invention. Other arrangements and methods can be implemented by those skilled in the art without departing from the scope of the present invention.

For example, the division of functions shown in FIGS. 2 and 3 and described above are intended solely for illustrative purposes. The functions disclosed herein may be provided by fewer or more components than explicitly shown.

In addition, although described primarily in the context of methods and systems, other implementations of the invention are also contemplated, as instructions stored on a machine-readable medium for instance.

We claim:

1. An apparatus comprising:
a queue monitor for monitoring an amount of communication traffic stored in a communication traffic queue, the communication traffic queue being configured to store communication traffic received from a traffic management device; and
a traffic controller, operatively coupled to the queue monitor, for determining based on the amount of communication traffic stored in the communication traffic queue a traffic management action to be performed, and for controlling the traffic management device to perform the determined traffic management action,
wherein the communication traffic queue is configured to receive communication traffic from the traffic management device through a communication equipment data path comprising a data path component that is operatively coupled to the communication traffic queue, to the traffic controller, and to the traffic management device,
wherein the traffic controller is configured for controlling the traffic management device by providing an indication of the determined traffic management action to the data path component through the data path, the indication causing the data path component to control the traffic management device to perform the determined traffic management action.

2. The apparatus of claim 1, wherein the data path component comprises a processor implementing the queue monitor and the traffic controller.

3. The apparatus of claim 2, wherein the data path component comprises a Field Programmable Gate Array.

4. Communication equipment comprising:
the apparatus of claim 1; and
the traffic management device, the traffic management device performing the determined traffic management action under control of the traffic controller.

5. The communication equipment of claim 4, wherein the apparatus and the traffic management device are implemented in respective electronic circuit cards.

6. A method comprising:
storing communication traffic received from a traffic management device to a communication traffic queue at a communication device;
monitoring at the communication device an amount of communication traffic stored in the communication traffic queue;
determining at the communication device, based on the amount of communication traffic stored in the communication traffic queue, a traffic management action to be performed; and
controlling the traffic management device to perform the determined traffic management action,
wherein the communication traffic is received from the traffic management device through a communication equipment data path comprising a data path component that is operatively coupled to the traffic management device, to the traffic controller, and to the traffic management device,
wherein controlling comprises providing an indication of the determined traffic management action to the data path component through the data path, the indication causing the data path component to control the traffic management device to perform the determined traffic management action.

* * * * *